US011150833B2

(12) United States Patent
Miyamoto

(10) Patent No.: US 11,150,833 B2
(45) Date of Patent: Oct. 19, 2021

(54) BACKUP APPARATUS

(71) Applicant: KONICA MINOLTA, INC., Tokyo (JP)

(72) Inventor: Yoshio Miyamoto, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 5 days.

(21) Appl. No.: 16/668,339

(22) Filed: Oct. 30, 2019

(65) Prior Publication Data
US 2020/0150870 A1    May 14, 2020

(30) Foreign Application Priority Data

Nov. 12, 2018    (JP) .............................. JP2018-211994

(51) Int. Cl.
*G06F 3/06* (2006.01)
*G06F 13/16* (2006.01)

(52) U.S. Cl.
CPC ............ *G06F 3/065* (2013.01); *G06F 3/0619* (2013.01); *G06F 3/0659* (2013.01); *G06F 3/0683* (2013.01); *G06F 13/1668* (2013.01)

(58) Field of Classification Search
CPC ...... G06F 3/065; G06F 3/0619; G06F 3/0659; G06F 3/0683; G06F 13/1668
See application file for complete search history.

(56) References Cited

U.S. PATENT DOCUMENTS

2013/0080699 A1* 3/2013 Shigeta ................. G06F 3/0608
711/114
2015/0163302 A1* 6/2015 Armstrong .......... H04L 67/1097
709/217

FOREIGN PATENT DOCUMENTS

JP    2002297207 A    10/2002

OTHER PUBLICATIONS

Espacenet English translation of Applicant cited Prior Art—JP2002297207 (Year: 2002).*

* cited by examiner

*Primary Examiner* — Ryan Bertram
*Assistant Examiner* — Edmund H Kwong
(74) *Attorney, Agent, or Firm* — Holtz, Holtz & Volek PC

(57) ABSTRACT

A backup apparatus includes a hardware processor that selects one of a plurality of devices, the devices being communicably connected to each other and each including a storage apparatus and a connection I/F to connect to an external storage apparatus, and collectively makes a backup of backup target data held by the plurality of devices into the external storage apparatus connected to the connection I/F of a selected device, wherein the hardware processor selects one of the plurality of devices on a basis of a predetermined selection condition including an amount of data of backup target data held by each of the devices.

6 Claims, 12 Drawing Sheets

| DEVICE | IMAGE DATA | SETTING DATA | TOTAL AMOUNT OF DATA |
|---|---|---|---|
| MFP | NO BACKUP | 200MB | 200MB |
| PRINTER CONTROLLER | 500MB | NO BACKUP | 500MB |

FIG. 12

| DEVICE | AMOUNT OF DATA | TRANSFER RATE |
|---|---|---|
| MFP | 1200MB | 30MB |
| PRINTER CONTROLLER | 600MB | 150MB |
| BETWEEN DEVICES | – | 60MB |

FIG. 13A

| | AMOUNT OF DATA | TRANSFER RATE | TRANSFER TIME |
|---|---|---|---|
| TOTAL AMOUNT OF DATA | 1800MB | 30MB | 60 SECONDS |
| TRANSFER RATE BETWEEN DEVICES | 600MB | 60MB | 10 SECONDS |
| TOTAL TIME | – | – | 70 SECONDS |

FIG. 13B

| | AMOUNT OF DATA | TRANSFER RATE | TRANSFER TIME |
|---|---|---|---|
| TOTAL AMOUNT OF DATA | 1800MB | 150MB | 12 SECONDS |
| TRANSFER RATE BETWEEN DEVICES | 1200MB | 60MB | 20 SECONDS |
| TOTAL TIME | – | – | 32 SECONDS |

| DEVICE | AMOUNT OF DATA | TRANSFER RATE |
|---|---|---|
| MFP-A | 1200MB | 30MB |
| MFP-B | 2400MB | 150MB |
| PRINTER CONTROLLER | 600MB | 100MB |
| MFP-A AND PRINTER CONTROLLER | - | 100MB |
| MFP-B AND PRINTER CONTROLLER | - | 60MB |

FIG. 17A

|  | AMOUNT OF DATA | TRANSFER RATE | TRANSFER TIME |
|---|---|---|---|
| TOTAL AMOUNT OF DATA | 4200MB | 30MB | 140 SECONDS |
| TRANSFER FROM PRINTER CONTROLLER TO MFP-A | 600MB | 100MB | 6 SECONDS |
| TRANSFER FROM MFP-B TO PRINTER CONTROLLER | 2400MB | 60MB | 40 SECONDS |
| TRANSFER FROM PRINTER CONTROLLER TO MFP-A (DATA OF MFP-B) | 2400MB | 100MB | 24 SECONDS |
| TOTAL TIME | – | – | 210 SECONDS |

FIG. 17B

|  | AMOUNT OF DATA | TRANSFER RATE | TRANSFER TIME |
|---|---|---|---|
| TOTAL AMOUNT OF DATA | 4200MB | 100MB | 42 SECONDS |
| TRANSFER FROM MFP-A TO PRINTER CONTROLLER | 1200MB | 100MB | 12 SECONDS |
| TRANSFER FROM MFP-B TO PRINTER CONTROLLER | 2400MB | 60MB | 40 SECONDS |
| TOTAL TIME | – | – | 94 SECONDS |

FIG. 17C

|  | AMOUNT OF DATA | TRANSFER RATE | TRANSFER TIME |
|---|---|---|---|
| TOTAL AMOUNT OF DATA | 4200MB | 150MB | 28 SECONDS |
| TRANSFER FROM PRINTER CONTROLLER TO MFP-B | 600MB | 60MB | 10 SECONDS |
| TRANSFER FROM MFP-A TO PRINTER CONTROLLER | 2400MB | 100MB | 24 SECONDS |
| TRANSFER FROM PRINTER CONTROLLER TO MFP-B (DATA OF MFP-A) | 2400MB | 60MB | 40 SECONDS |
| TOTAL TIME | – | – | 102 SECONDS |

BACKUP APPARATUS

The entire disclosure of Japanese patent Application No. 2018-211994, filed on Nov. 12, 2018, is incorporated herein by reference in its entirety.

BACKGROUND

Technological Field

The present invention relates to a backup apparatus that makes a backup by aggregating data held in a plurality of devices into a single storage apparatus.

Description of the Related Art

As a data backup method in a system in which a plurality of devices operate in conjunction with each other such as a multifunction peripheral and a printer controller, there are a method of making a backup individually by providing a storage apparatus such as a hard disk for each device, and a method of making a backup by aggregating data held in the plurality of devices into one storage apparatus. In addition, there are a method of using a storage apparatus included in a device as a storage apparatus for backup, and a method of using an external storage apparatus.

In JP 2002-297207 A, in view of the fact that using an external storage apparatus for backup for each device increases the cost, a system is disclosed that collectively makes a backup of data stored in a plurality of devices into a minimum number of external storage apparatuses (one external storage apparatus).

In the system disclosed in JP 2002-297207 A, although the number of external storage apparatuses can be reduced, it is not considered whether the minimum number of external storage apparatuses (one external device) is connected to an optimum device. For that reason, for example, in a case where there are a device having a large amount of data of backup target data and a device having a small amount of data of backup target data, when an external storage apparatus is connected to the latter device, an amount of data transferred between devices increases as compared with a case where the external storage apparatus is connected to the former device, so that it takes a long time for backup processing.

SUMMARY

The present invention is intended to solve the above problem, and an object of the present invention is to provide a backup apparatus enabled to collectively make a backup of backup target data held in a plurality of devices into an external storage apparatus connected to an optimum device among the plurality of devices.

To achieve the abovementioned object, according to an aspect of the present invention, a backup apparatus reflecting one aspect of the present invention comprises a hardware processor that selects one of a plurality of devices, the devices being communicably connected to each other and each including a storage apparatus and a connection I/F to connect to an external storage apparatus, and collectively makes a backup of backup target data held by the plurality of devices into the external storage apparatus connected to the connection I/F of a selected device, wherein the hardware processor selects one of the plurality of devices on a basis of a predetermined selection condition including an amount of data of backup target data held by each of the devices.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 12 is a diagram indicating a list of information acquired in steps S402 to S404 of FIG. 11 in a case where the printer controller and the MFP are set as backup target devices;

FIGS. 13A and 13B are diagrams indicating a required backup time in a case where an external storage apparatus is connected to the MFP and a required backup time in a case where the external storage apparatus is connected to the printer controller, calculated on the basis of the information indicated in FIG. 12;

FIGS. 17A to 17C indicate a required backup time in a case where the external storage apparatus is connected to the MFP-A, a required backup time in a case where the external storage apparatus is connected to the MFP-B, and a required backup time in a case where the external storage apparatus is connected to the printer controller, calculated on the basis of the information illustrated in FIG. 16.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
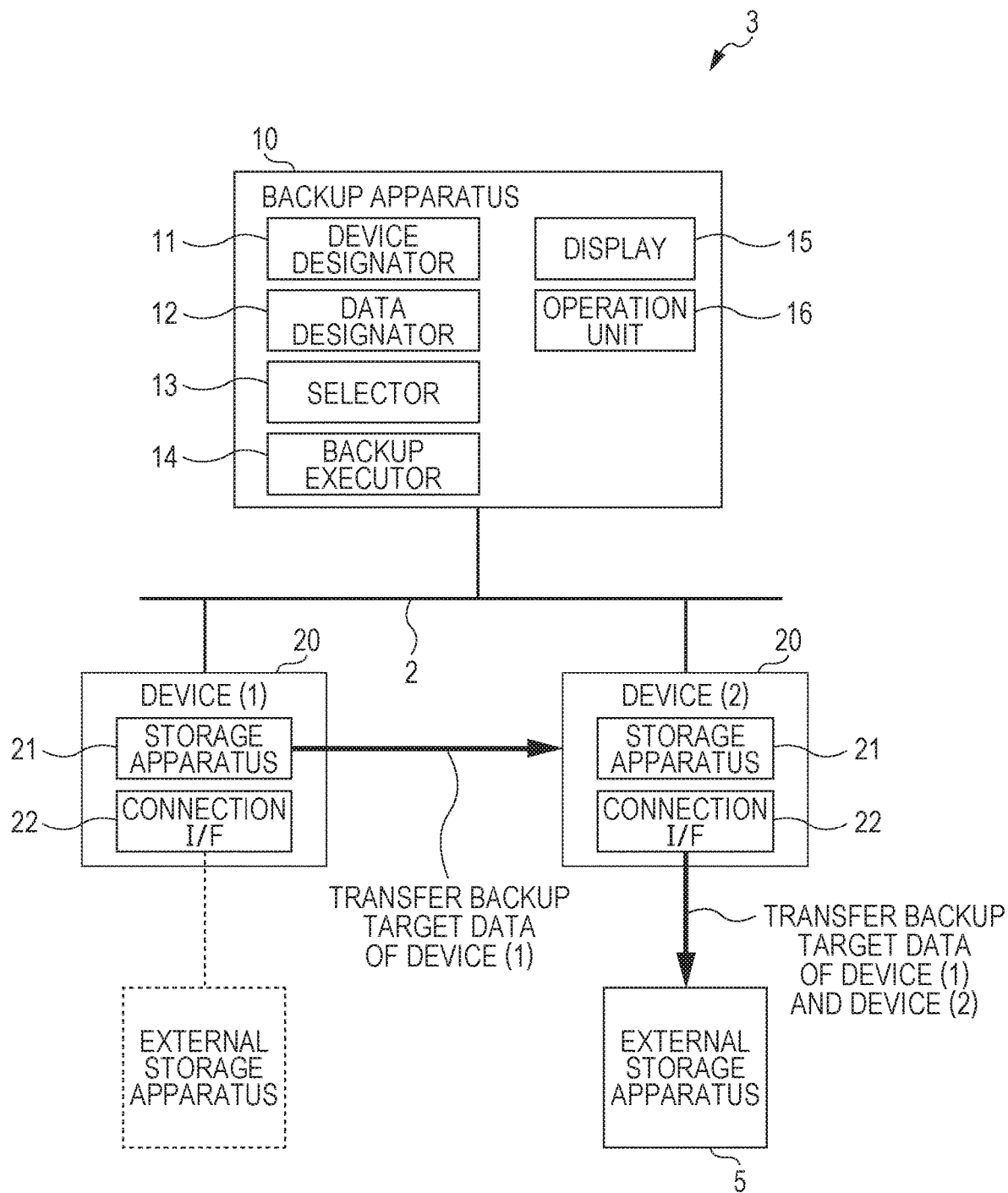
FIG. 1 is a diagram illustrating an example of a backup system in which a backup apparatus according to an embodiment of the present invention and a plurality of devices that holds backup target data are communicably connected to each other.

FIG. 1 is a diagram illustrating an example of a backup system 3 in which a backup apparatus 10 according to an embodiment of the present invention and a plurality of devices 20 that holds backup target data are communicably connected to each other. In this example, there are two devices 20, a device (1) and a device (2).

Each device 20 includes a storage apparatus 21 of nonvolatile and a large capacity such as a hard disk apparatus, and a connection I/F 22 to detachably connect to an external storage apparatus 5 such as a hard disk apparatus. Moreover, the device 20 includes a central processing unit (CPU), a read only memory (ROM), a random access memory (RAM), and the like, and executes various types of processing and saves data that should be held in the storage apparatus 21.

The backup apparatus 10 performs a function of controlling operation of collectively making a backup of backup target data held in the plurality of devices 20 to be managed into the external storage apparatus 5 connected to one of the devices 20.

The backup apparatus 10 includes a device designator 11 that receives designation of a backup target device from a user, a data designator 12 that receives designation of backup target data (designation of a type of data, or the like) from the user, a selector 13 that selects one device 20 to which the external storage apparatus 5 should be connected, and a backup executor 14 that transfers backup target data held by the plurality of devices 20 to the device 20 selected by the selector 13 and collectively makes a backup into the external storage apparatus 5 connected to the connection I/F 22 of the device.

The selector 13 has a function of calculating an amount of data of the backup target data held by the backup target device, and a function of acquiring a transfer rate of data between devices and to the external storage apparatus 5, and selects a device to which the external storage apparatus 5 should be connected on the basis of the calculated amount of data and the transfer rate.

The backup apparatus 10 includes a display 15 such as a liquid crystal display that displays various screens, and an operation unit 16 that receives various types of operation from the user. The display 15 displays, for example, a message that notifies the user of a device to which the external storage apparatus 5 should be connected (a device selected by the selector 13). The device designator 11 and the data designator 12 use the display 15 and the operation unit 16 to accept designation of the backup target device and designation of the backup target data.

Note that, a plurality of devices set in advance or all devices that are communicably connected may be set as backup target devices without providing the device designator 11. In addition, data of a type set in advance or all data held in a nonvolatile manner by each device may be set as backup target data without providing the data designator 12.

Figure 2:
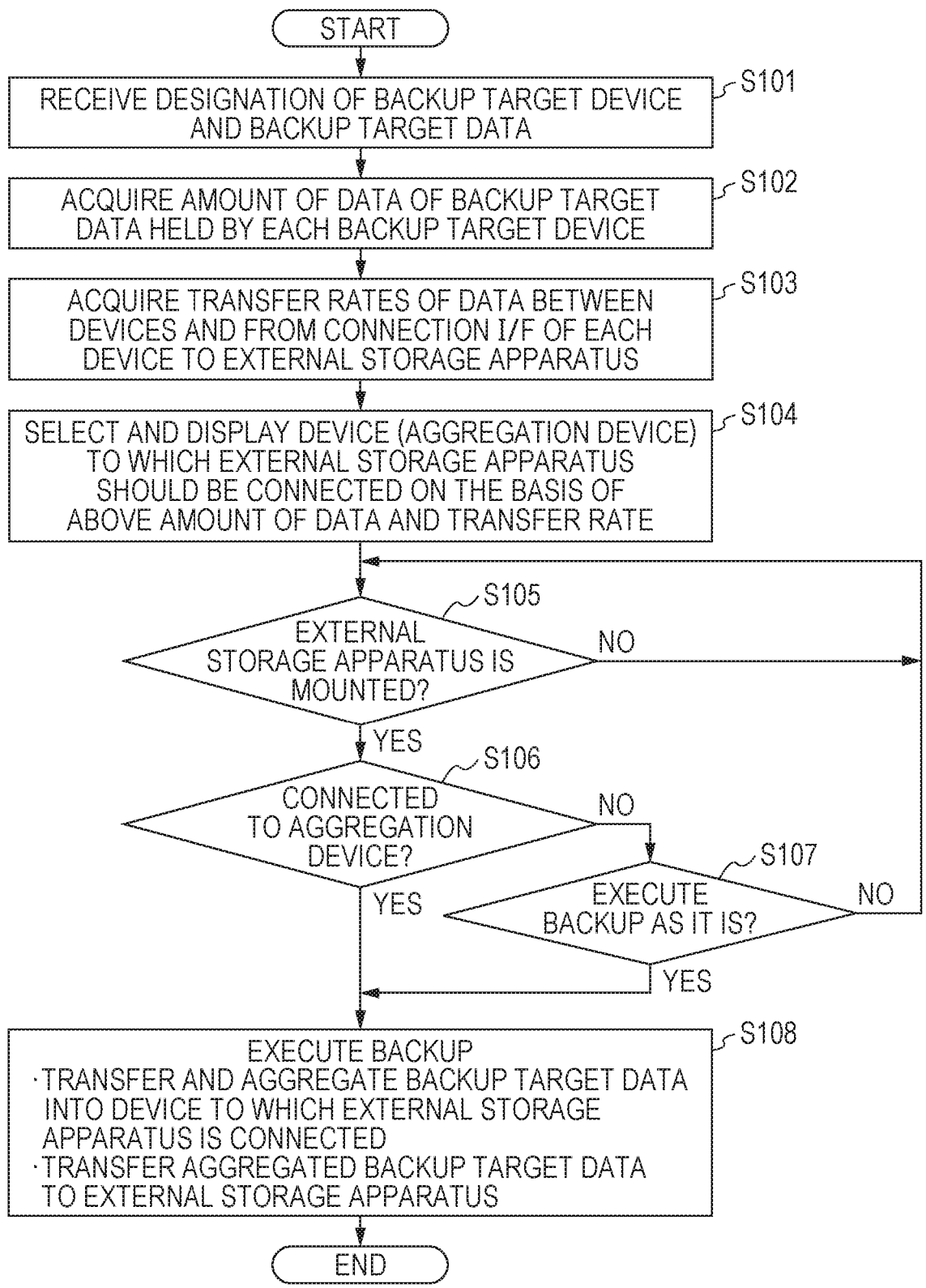
FIG. 2 is a flowchart illustrating processing performed by the backup apparatus.

FIG. 2 illustrates a flow of processing performed by the backup apparatus 10. From the user, designation is received of the backup target device and the backup target data (step S101). For example, a list is displayed of devices connected to the backup apparatus 10, and operation is received of designating the backup target device from the list. The designation of the backup target data is received for each backup target device, or the designation is collectively received for all devices. As a designation method of the backup target data, any method can be used, for example, a method of receiving with an attribute of data (type of data, update date range, folder designation, or the like).

Next, the selector 13 of the backup apparatus 10 calculates the amount of data of the backup target data held by each backup target device (step S102). For example, the backup apparatus 10 inquires of each device 20 the amount of data of the backup target data, whereby the amount of data may be acquired of the backup target data held by each backup target device.

In addition, the backup apparatus 10 acquires the transfer rate between the devices, and the transfer rate between the connection I/F 22 of each device and the external storage apparatus 5 connected thereto (step S103). Information on these transfer rates is acquired by, for example, a method of inquiring a communication standard and the like that can be used for each device 20 from the backup apparatus 10, or registering the information in advance in the backup apparatus 10 and referring to the registered information; however, not limited thereto, any methods can be used.

Next, the selector 13 of the backup apparatus 10 selects any one device to which the external storage apparatus 5 should be connected on the basis of the amount of data of the backup target data held by each device and the above transfer rate, and the selected device is displayed on the display 15 (step S104). The selected device is set as an aggregation device.

Examples of selection criteria are described below. (Selection criterion 1) A device having the maximum amount of data of the backup target data is selected as the aggregation device. (Selection criterion 2) A device having the shortest required time to complete making a backup is selected as the aggregation device.

The user connects the external storage apparatus 5 to any one device with reference to the display of the selected aggregation device.

The backup apparatus 10 monitors a connection status of the external storage apparatus 5, and when the external storage apparatus 5 is connected to any one device (step S105; Yes), confirms whether or not the device to which the external storage apparatus 5 is connected is the aggregation device (step S106).

In a case where the device connected to the external storage apparatus 5 is not the aggregation device selected in step S104 (step S106; No), it is inquired of the user whether or not to execute backup as it is (step S107).

In a case where the user's answer is "connection destination change" (step S107; No), the processing returns to step S105 and waits for the external storage apparatus 5 to be connected to another device.

In a case where the user's answer is "execute backup as it is" (step S107; Yes), backup target data held by a backup target device other than the device to which the external storage apparatus 5 is connected is transferred to the device to which the external storage apparatus 5 is connected and all the backup target data are aggregated into the device, and the aggregated backup target data is transferred to the external storage apparatus 5 connected to the connection I/F 22 of the device and a backup is collectively made (step S108).

In a case where the device to which the external storage apparatus 5 is connected is the aggregation device selected in step S104 (step S106; Yes), backup target data held by a backup target device other than the aggregation device is transferred to the aggregation device and all the backup target data are aggregated into the aggregation device, and the aggregated backup target data is transferred to the external storage apparatus 5 connected to the connection I/F 22 of the aggregation device and a backup is collectively made (step S108).

Next, the present invention will be described in more detail with an example configuration in which the device (1) is a printer controller, the device (2) is a multifunction peripheral (MFP) to which the printer controller is connected, and both the printer controller and the MFP have the function of the backup apparatus 10.

Figure 3:
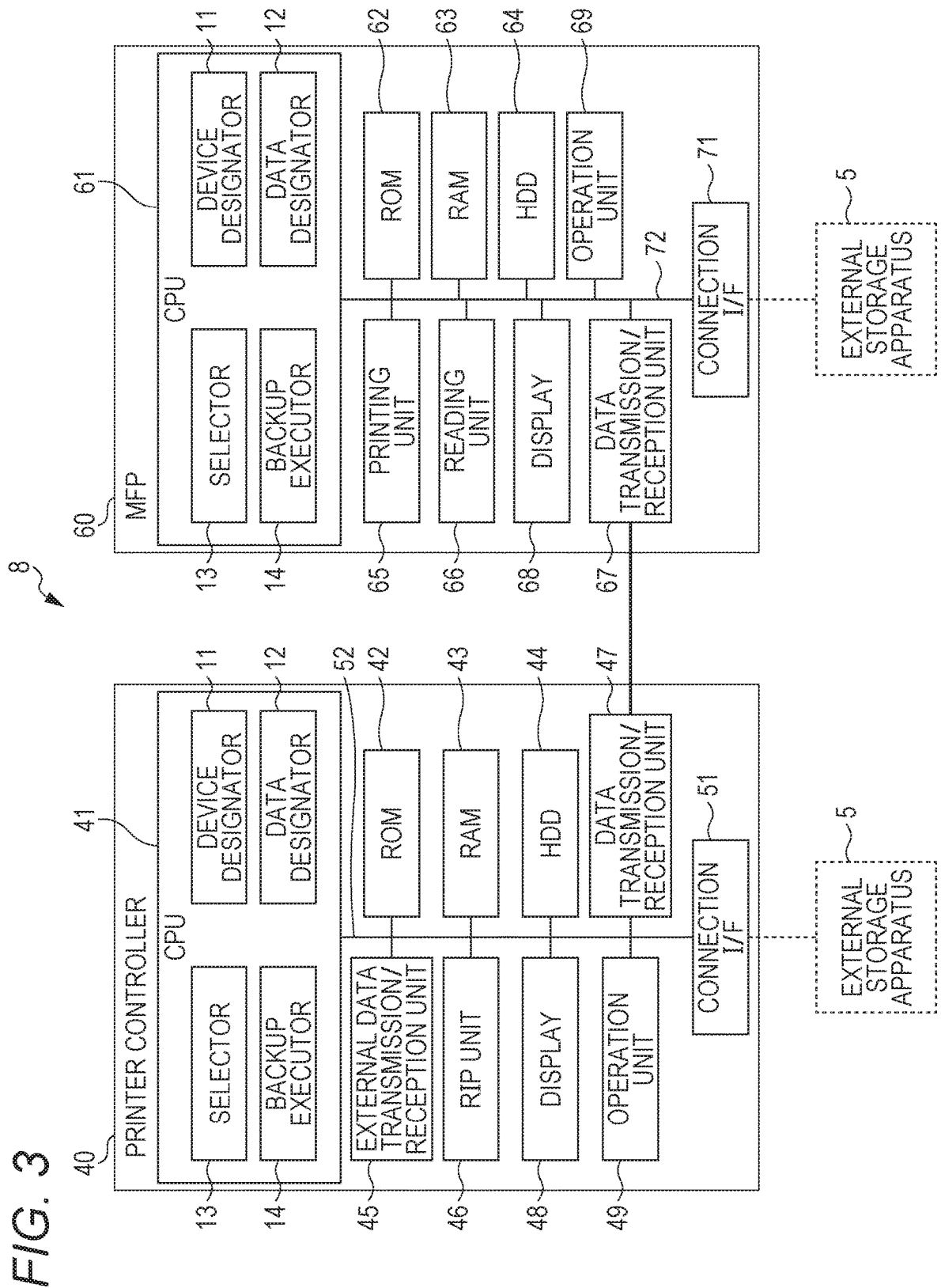
FIG. 3 is a diagram illustrating a configuration example of an image forming system in which a printer controller having a function of the backup apparatus and an MFP having a function of the backup apparatus are communicably connected to each other.

FIG. 3 illustrates a configuration example of an image forming system 8 in which a printer controller 40 having the function of the backup apparatus 10 and an MFP 60 having the function of the backup apparatus 10 are communicably connected to each other.

The printer controller 40 performs a function of rasterizing print data described in PDL or the like received from the outside, developing the data into image data, and outputting the image data to the MFP 60. The MFP 60 is a so-called multifunction peripheral having a printing function of forming an image on a recording sheet on the basis of data received from the printer controller 40, a copying function of optically reading a document and forming an image of a copy of the read image on a recording sheet, a facsimile function, and the like.

The printer controller 40 includes a CPU 41, a ROM 42, a RAM 43, a hard disk apparatus (HDD) 44, an external data transmission/reception unit 45, an RIP unit 46, a data transmission/reception unit 47, a display 48, an operation unit 49, and a connection I/F 51 that are connected to a common bus 52. The CPU 41 executes a program stored in the ROM 42, thereby performing functions of the printer controller 40 and the device designator 11, the data designator 12, the selector 13, the backup executor 14, and the like of the backup apparatus 10 described above.

The external data transmission/reception unit 45 performs a function of transmitting/receiving print data and the like between a network and the printer controller 40 via a network port. The RIP unit 46 performs a function (RIP function) of rasterizing received print data and developing the data into image data.

The data transmission/reception unit 47 performs functions of transmitting data generated by developing in the RIP unit 46 to the MFP 60, and transferring backup target data to/from the MFP 60. The display 48 displays a selection result of the selector (information indicating which device should be connected to the external storage apparatus 5 for backup), various setting screens, operation screens, and the like. The operation unit 49 accepts operations such as designation of the backup target device and designation of the backup target data from the user.

The MFP 60 includes a CPU 61, a ROM 62, a RAM 63, a hard disk apparatus (HDD) 64, a printing unit 65, a reading unit 66, a data transmission/reception unit 67, a display 68, an operation unit 69, and a connection I/F 71 that are connected to a common bus 72. The CPU 61 executes a program stored in the ROM 62, thereby integrally controlling operation of the MFP 60 and performing functions of the device designator 11, the data designator 12, the selector 13, the backup executor 14, and the like of the backup apparatus 10 described above.

The data transmission/reception unit 67 performs a function of transmitting/receiving data such as data after RIP and backup target data to/from the printer controller 40.

The reading unit 66 performs a function of optically reading a document and outputting corresponding image data. The printing unit 65 performs a function of outputting an image based on data received from the printer controller 40, and a read image obtained by reading the document by the reading unit 66, by printing the image on a recording sheet.

The display 68 displays a selection result of the selector 13 (information indicating which device should be connected to the external storage apparatus 5 for backup), various setting screens, operation screens, and the like. The operation unit 69 accepts various operations such as designation of the backup target device and designation of the backup target data from the user.

The printer controller 40 and the MFP 60 illustrated in FIG. 3 each include one hard disk apparatus (HDD) 44 or 64, but may include a plurality of HDDs. In a case where the plurality of HDDs is included, each may be used for storing different types of data, or the plurality of HDDs may be used as one HDD in a redundant arrays of independent disks (RAID) configuration.

Next, various aspects will be described of backup processing in the image forming system 8.

First Aspect

Case Where Only Backup Target Device is Designated

Figure 4:
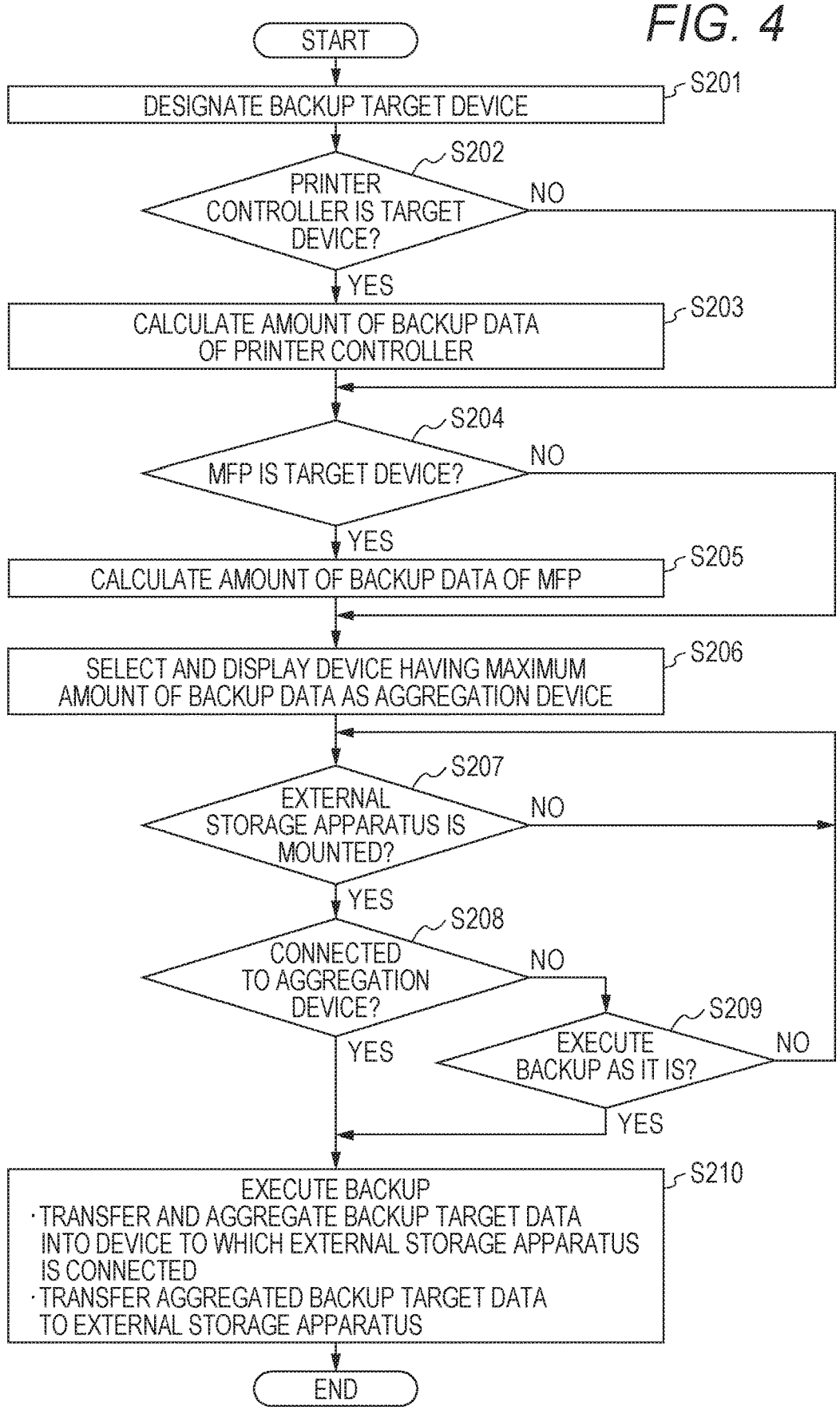
FIG. 4 is a flowchart illustrating a backup processing procedure in a first aspect of the image forming system.

FIG. 4 is a flowchart illustrating a processing procedure in a first aspect. The user performs input operation of an instruction regarding backup with the operation units 49 or 69 of a device of either the printer controller 40 or the MFP 60. The device designator 11 of a device having received the input operation (referred to as an operation device) accepts designation of the backup target device from the user (step S201).

Figure 5:
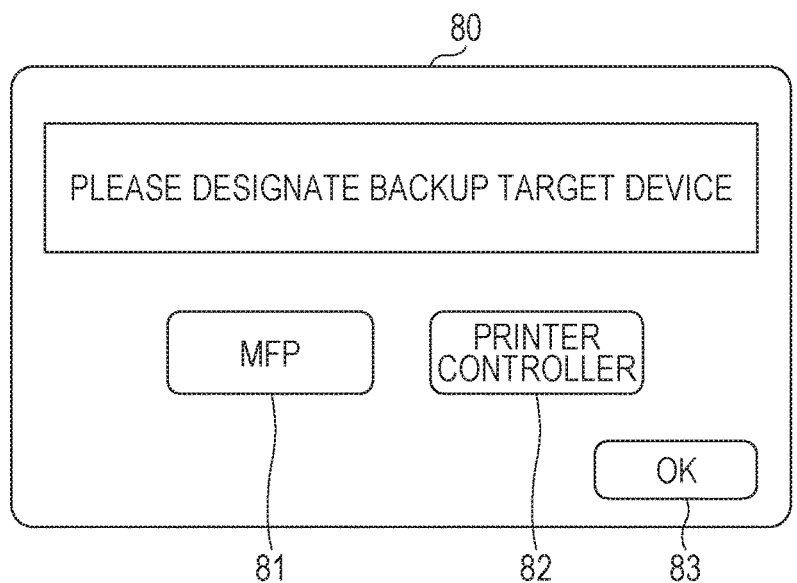
FIG. 5 is a diagram illustrating an example of a device designation screen that accepts designation of a backup target device from a user.

FIG. 5 illustrates an example of a device designation screen 80 that accepts the designation of the backup target device from the user. The device designation screen 80 is displayed on the display 48 of the printer controller 40 in a case where device designation operation is received by the printer controller 40, and is displayed on the display 68 of the MFP 60 in a case where device designation operation is received by the MFP 60.

When an MFP designation button 81 is pressed displayed on the device designation screen 80, the MFP 60 is designated as the backup target device, and when the MFP designation button 81 is pressed again in the designated state, the designation is canceled. Similarly, when a printer controller designation button 82 is pressed displayed on the device designation screen 80, the printer controller 40 is designated as the backup target device, and when the printer controller designation button 82 is pressed again in the designated state, the designation is canceled. When an OK button 83 is pressed, the designated state at that time is determined.

Returning to FIG. 4, description will be continued. The selector 13 of the device (operation device) having accepted the designation of the backup target device from the user confirms whether or not the designated backup target device includes the printer controller 40 (step S202). In a case where the backup target device includes the printer controller 40 (step S202; Yes), an amount of data is calculated of the backup target data held by the printer controller 40 (step S203), and the processing proceeds to step S204. In a case where the backup target device does not include the printer controller 40 (step S202; No), the processing proceeds to step S204.

In step S204, the selector 13 of the device (operation device) having accepted the designation of the backup target device from the user confirms whether or not the designated backup target device includes the MFP 60. In a case where the backup target device includes the MFP 60 (step S204; Yes), an amount of data is calculated of the backup target data held by the MFP 60 (step S205), and the processing proceeds to step S206. In a case where the backup target device does not include the MFP 60 (step S204; No), the processing proceeds to step S206.

Figure 6:
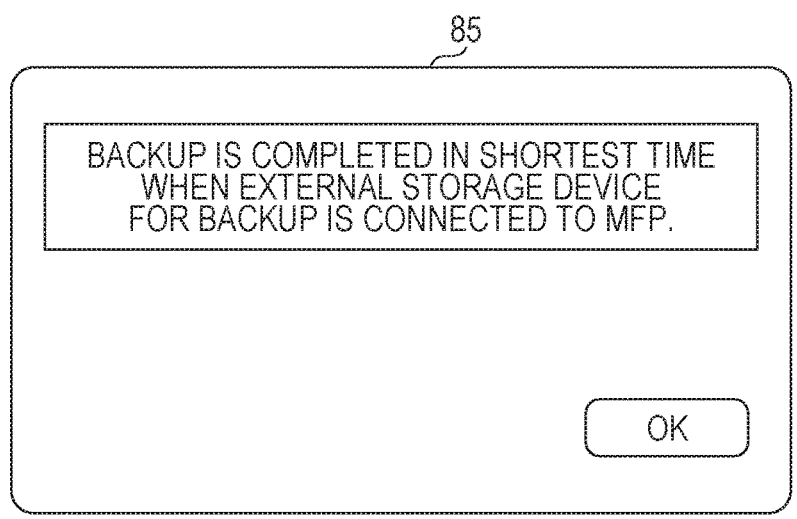
FIG. 6 is a diagram illustrating an example of a connection destination guide screen that notifies the user of an aggregation device.

In step S206, the selector 13 of the operation device selects as the aggregation device the device having the maximum amount of data of the backup target data calculated previously, and displays the selected aggregation device on the display of the operation device. FIG. 6 is an example of a connection destination guide screen 85 that notifies the user of the aggregation device.

The user connects (mounts) the external storage apparatus 5 on a device of either the printer controller 40 or the MFP 60 with reference to the above display. The selector 13 of the operation device monitors the connection status of the external storage apparatus 5, and when the external storage apparatus 5 is connected to any device (step S207), confirms whether or not a device to which the external storage apparatus 5 is connected is the aggregation device determined in step 206 (step S208).

In a case where the device to which the external storage apparatus 5 is connected is the aggregation device (step S208; Yes), the processing proceeds to step S210. In a case where the external storage apparatus 5 is connected to a device different from the aggregation device (step S208; No), a connection destination change inquiry screen 87 is displayed on the display of the operation device, and it is inquired of the user whether or not to execute backup with the current connection destination as it is (step S209).

Figure 7:
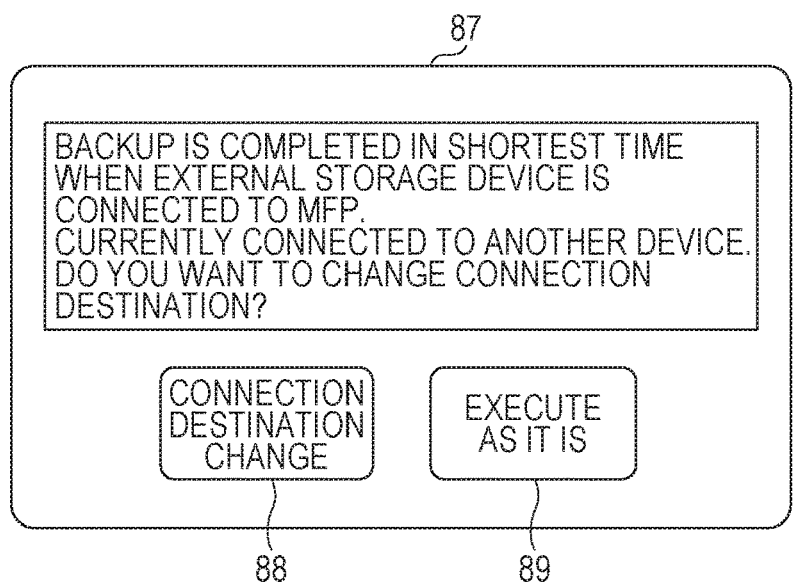
FIG. 7 is a diagram illustrating an example of a connection destination change inquiry screen.

FIG. 7 illustrates an example of the connection destination change inquiry screen 87. The connection destination change inquiry screen 87 displays a message including an aggregation device recommended as the connection destination of the external storage apparatus, the fact that the current connection destination is different from the aggregation device, and an inquiry whether or not to change the connection destination. Further, the connection destination change inquiry screen 87 displays a connection destination change button 88 that is pressed in a case where the connection destination is to be changed, and an execute-as-it-is button 89 that is pressed in a case where the backup is to be executed as it is, and the user's answer is accepted by these selection buttons.

In a case where an answer is received indicating that the backup is to be executed with the current connection destination as it is, from the user (FIG. 4, step S209; Yes), the processing proceeds to step S210. In a case where an answer is received indicating that the connection destination is to be changed, from the user (step S209; No), the processing returns to step S207, and waits for the external storage apparatus 5 to be connected to another device. The user remounts the external storage apparatus 5 on another device.

In step S210, backup is executed. Specifically, backup target data held by a backup target device other than the device to which the external storage apparatus 5 is connected is transferred to the device to which the external storage apparatus 5 is connected and all the backup target data are aggregated into the device, and the aggregated backup target data is transferred to the external storage apparatus 5 connected to the connection I/F 22 of the device and a backup is collectively made (step S210).

That is, in a case where the external storage apparatus 5 is connected to the printer controller 40, the backup target data held by the MFP 60 is transferred to the printer controller 40, and the printer controller 40 transfers both the backup target data held by the printer controller 40 and the backup target data transferred from the MFP 60 to the external storage apparatus 5 connected to the printer controller 40, to make a backup. On the other hand, in a case where the external storage apparatus 5 is connected to the MFP 60, the backup target data held by the printer controller 40 is transferred to the MFP 60, and the MFP 60 transfers both the backup target data held by the MFP 60 and the backup target data transferred from the printer controller 40 to the external storage apparatus 5 connected to the MFP 60, to make a backup.

A specific example of control at the time of executing backup is as follows, for example, but is not limited thereto. In a case where the external storage apparatus 5 is connected to the operation device, the backup executor 14 of the operation device transmits a transfer request for backup target data to the backup executor 14 of another device, and the backup executor 14 of the other device having received the transfer request transfers the backup target data held by the other device to the device that is a transmission source of the transmission request. The backup executor 14 of the operation device transfers both the backup target data held by the operation device and the backup target data transferred from the other device to the external storage apparatus 5 connected to the operation device, to make a backup.

On the other hand, in a case where the external storage apparatus 5 is connected to a device other than the operation device, the backup executor 14 of the operation device transmits a delegation request for backup control to the backup executor 14 of the device to which the external storage apparatus 5 is connected. The backup executor 14 of the device having received the delegation request transmits a transfer request for backup target data to the backup executor 14 of another device, and the backup executor 14 of the other device having received the transfer request transfers the backup target data held by the other device to the device that is a transmission source of the transmission request. The backup executor 14 of the device having received the delegation request transfers both the backup target data held by the device having received the delegation request and the backup target data transferred from the other device to the external storage apparatus 5 connected to the device having received the delegation request, to make a backup.

Note that, the above control is an example and is not a limitation. In addition, in this example, a case has been described where there are two backup target devices, the printer controller 40 and the MFP 60, but the same applies to three or more devices.

Second Aspect

Case Where Backup Target Device and Backup Target Data are Designated

Figure 8:
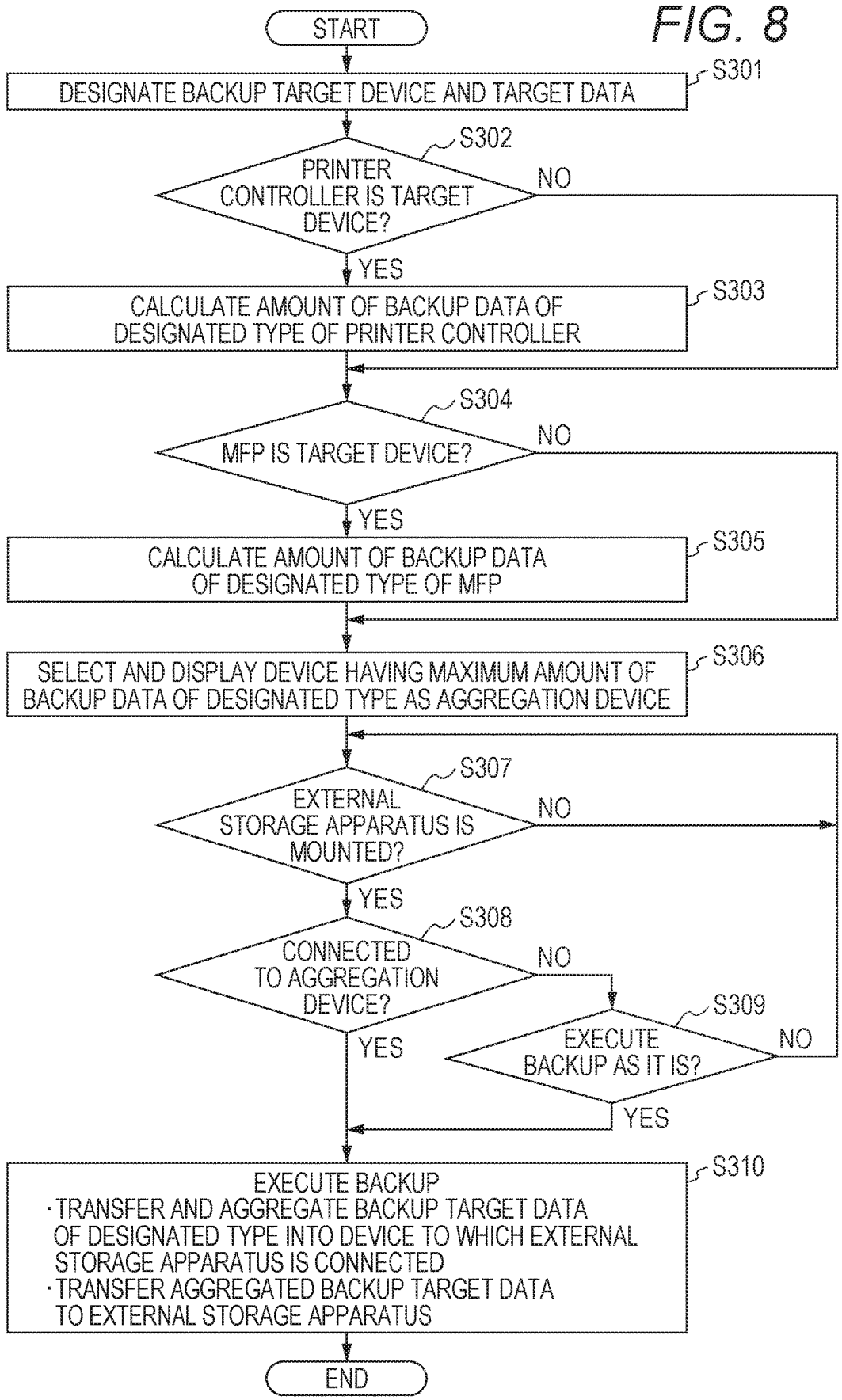
FIG. 8 is a flowchart illustrating a backup processing procedure in a second aspect of the image forming system.

FIG. 8 is a flowchart illustrating a processing procedure in a second aspect. The user performs input operation of an instruction regarding backup with the operation units 49 or 69 of a device of either the printer controller 40 or the MFP 60. The device designator 11 and the data designator 12 of a device having received the input operation (referred to as an operation device) accept designation of the backup target device and designation of the backup target data (step S301).

Designation of the backup target data is performed on the basis of an attribute of data, for example, a type of data (image data, setting data, or the like), a range of the date and time created and changed, a folder of a save destination, or the like, but not limited thereto.

Figures 9, 10:
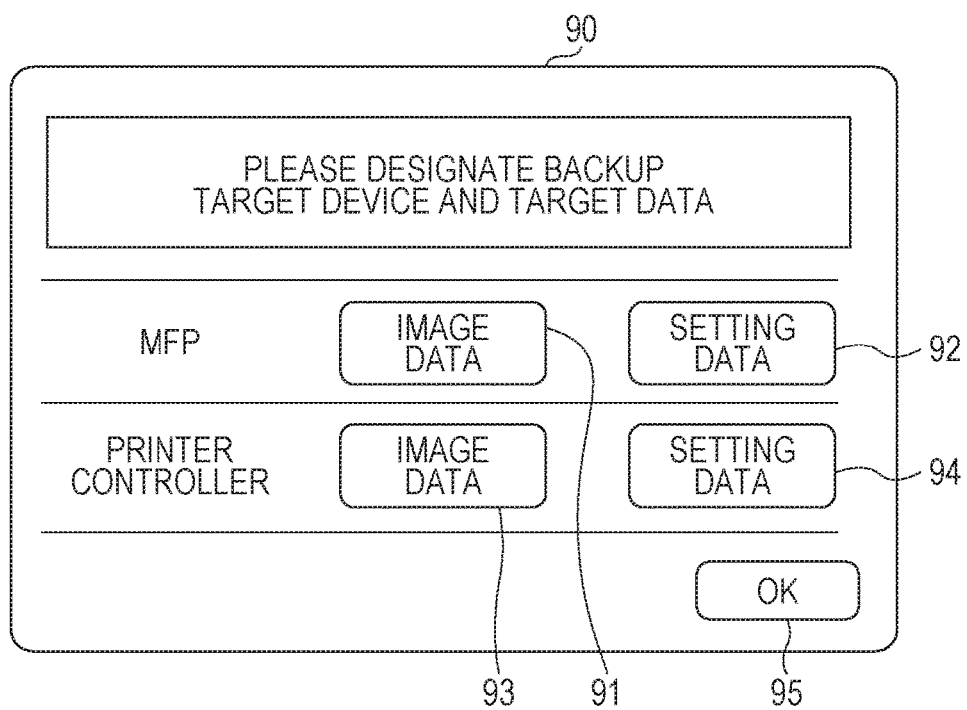
FIG. 9 is a diagram illustrating an example of a device and data designation screen that accepts designation of a backup target device and backup target data from the user.
FIG. 10 is a diagram indicating an example of an amount of data of backup target data of a designated type held by each device.

FIG. 9 illustrates an example of a device and data designation screen 90 that accepts designation of the backup target device and the backup target data from the user. The device and data designation screen 90 is displayed on the display 48 of the printer controller 40 in a case where designation operation of the device and the like is received by the printer controller 40, and is displayed on the display 68 of the MFP 60 in a case where the designation operation of the device and the like is received by the MFP 60.

When an image data button 91 is pressed displayed in the MFP column of the device and data designation screen 90, image data held in the MFP 60 is designated as the backup target data, and when a setting data button 92 is pressed displayed in the MFP column, setting data held in the MFP 60 is designated as the backup target data. Both may be selected. When each button is pressed again in the designated state, the designation corresponding to the pressed button is canceled. When at least one of the image data or the setting data held by the MFP 60 is designated as the backup target data, the MFP 60 is automatically designated as the backup target device.

When an image data button 93 is pressed displayed in the printer controller column of the device and data designation screen 90, image data held in the printer controller 40 is designated as the backup target data, and when a setting data button 94 is pressed displayed in the printer controller column, setting data held in the printer controller 40 is designated as the backup target data. Both may be selected. When each button is pressed again in the designated state, the designation corresponding to the pressed button is canceled. When at least one of the image data or the setting data held by the printer controller 40 is designated as the backup target data, the printer controller 40 is automatically designated as the backup target device.

Here, it is assumed that the image data is data having been subjected to RIP in the printer controller 40, and the data having been subjected to RIP is converted into bitmap data in the MFP 60. The setting data indicates, for example, ticket information of a print job in the printer controller 40, and various parameters of image processing in the MFP 60. Note that, the image data and setting data are not limited to these.

Returning to FIG. 8, description will be continued. The selector 13 of a device (operation device) having accepted designation of the backup target device or the like from the user confirms whether or not the designated backup target device includes the printer controller 40 (step S302). In a case where the backup target device includes the printer controller 40 (step S302; Yes), an amount of data is calculated of the backup target data of a type designated, in step S301 among data held by the printer controller 40 (step S303), and the processing proceeds to step S304. In a case where the backup target device does not include the printer controller 40 (step S302; No), the processing proceeds to step S304.

In step S304, it is confirmed whether or not the designated backup target device includes the MFP 60. In a case where the backup target device includes the MFP 60 (step S304; Yes), an amount of data is calculated of the backup target data of the type designated in step S301 among data held by the MFP 60 (step S305), and the processing proceeds to step S306. In a case where the backup target device does not include the MFP 60 (step S304; No), the processing proceeds to step S306.

In step S306, the selector 13 of the operation device selects as the aggregation device the device having the maximum amount of data of the backup target data calculated previously, and displays the selected aggregation device on the display of the operation device. FIG. 10 indicates an example of the amount of data of the backup target data of the designated type held by each device. In this example, for the MFP 60, the image data is not designated as the backup target data, and only the setting data is designated as the backup target data. For the printer controller 40, the setting data is not designated as the backup target data, and only the image data is designated as the backup target data. A device having the maximum total amount of data of the backup target data of the designated type is selected as the aggregation device. In the example of FIG. 10, the printer controller 40 is selected as the aggregation device. Also in the second aspect, a selection result is displayed on the connection destination guide screen 85 similar to that in FIG. 6.

The user connects (mounts) the external storage apparatus 5 on a device of either the printer controller 40 or the MFP 60 with reference to the above display. The selector 13 of the operation device monitors the connection status of the external storage apparatus 5, and when it is confirmed that the external storage apparatus 5 is connected to any device (step S307), confirms whether or not the device to which the external storage apparatus 5 is connected is the aggregation device determined in step 306 (step S308).

In a case where the device to which the external storage apparatus 5 is connected is the aggregation device (step S308; Yes), the processing proceeds to step S310. In a case where the external storage apparatus 5 is connected to a device different from the aggregation device (step S308; No), similarly to the first aspect, the connection destination change inquiry screen 87 as illustrated in FIG. 7 is displayed on the display of the operation device, and it is inquired of the user whether or not to execute backup with the current connection destination as it is (step S309).

In a case where an answer is received indicating that the backup is to be executed with the current connection destination as it is, from the user (step S309; Yes), the processing proceeds to step S310. In a case where an answer is received indicating that the connection destination is to be changed, from the user (step S309; No), the processing returns to step S307, and waits for the external storage apparatus 5 to be connected to another device. The user remounts the external storage apparatus 5 on another device.

In step S310, backup is executed. Specifically, backup target data of the designated type held by a backup target device other than the device to which the external storage apparatus 5 is connected is transferred to the device to which the external storage apparatus 5 is connected and all the backup target data of the designated type are aggregated into the device, and the aggregated backup target data is transferred to the external storage apparatus 5 connected to the connection I/F 22 of the device and a backup is collectively made (Step S310).

Note that, in this example, a case has been described where there are two backup target devices, the printer controller 40 and the MFP 60, but the same applies to three or more devices.

Third Aspect

Figure 11:
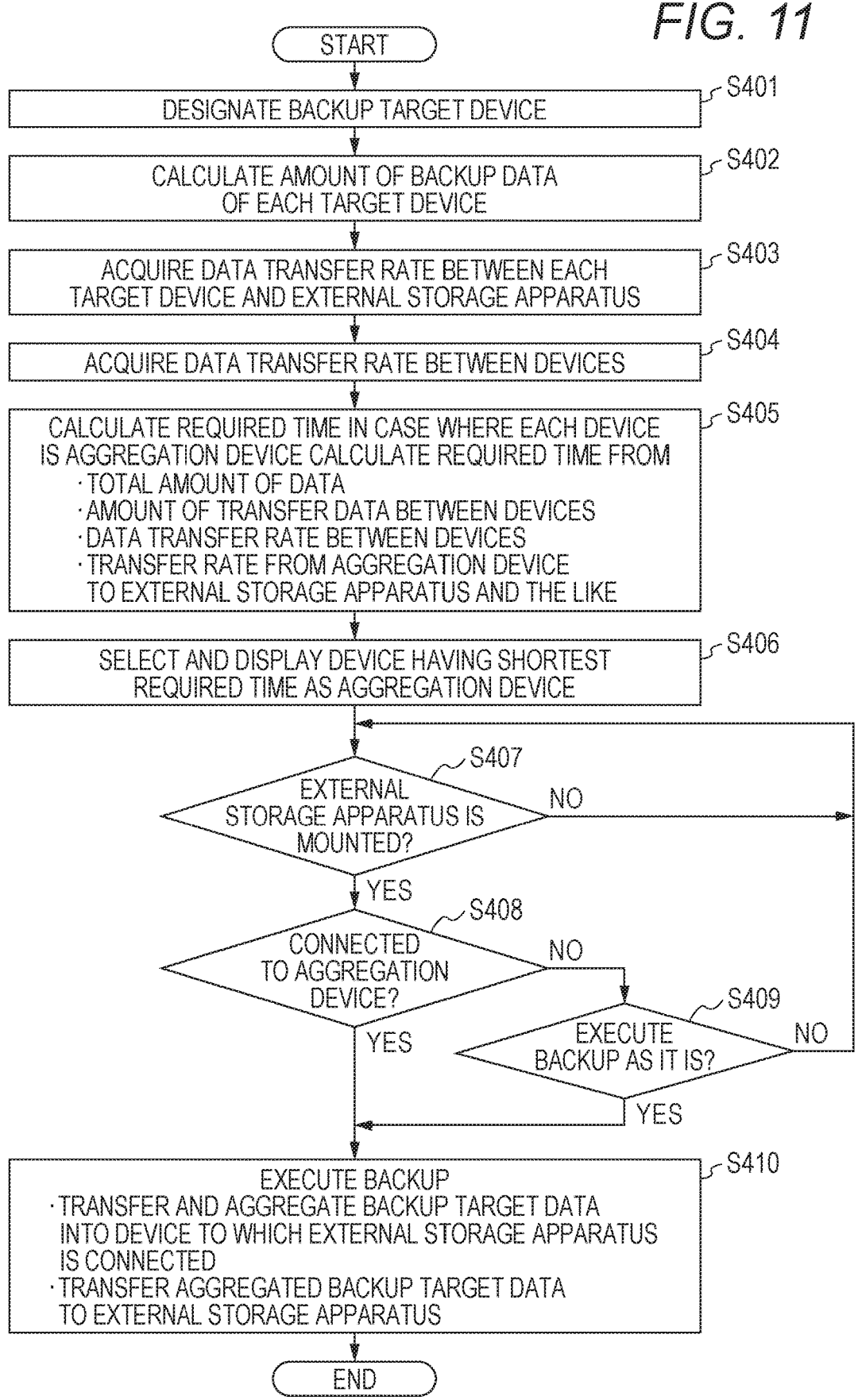
FIG. 11 is a flowchart illustrating a backup processing procedure in a third aspect of the image forming system.

Case Where Data Transfer Rates Between Devices and From Devices to External Storage Apparatus are Considered, and Only Backup Target Device is Designated FIG. 11 is a flowchart illustrating a processing procedure in a third aspect. The user performs input operation of an instruction regarding backup with the operation units 49 or 69 of a device of either the printer controller 40 or the MFP 60. The device designator 11 of a device having received the input operation (referred to as an operation device) accepts designation of the backup target device (step S401).

The selector 13 of the device (operation device) having accepted the designation of the backup target device from the user calculates an amount of data of the backup target data held by each designated backup target device (step S402). Next, a data transfer rate to the external storage apparatus 5 is acquired in each backup target device (step S403), and further, a data transfer rate between the backup target devices is acquired (step S404). The data transfer rate from the device to the external storage apparatus 5 is determined from a data transfer rate of the connection I/F (22, 51, 71) mounted on the device, and a data transfer rate (reception rate) of the external storage apparatus 5 itself. In general, a slower data transfer rate is adopted. For example, in the case of USB connection, it may be determined from each standard (USB 2.0, USB 3.0, or the like), but is not limited thereto.

Next, the selector 13 of the operation device calculates a required time regarding backup execution in a case where each device is the aggregation device on the basis of information acquired in steps S402 to S404 (step S405), and a device having the shortest required time regarding the backup execution is selected as the aggregation device, and the selected aggregation device is displayed on the display of the operation device (step S406). Subsequent operations (steps S407 to S410) are the same as steps S207 to S210 illustrated in FIG. 4, and description thereof will be omitted.

FIG. 12 indicates a list of the information acquired in steps S402 to S404 of FIG. 11 in a case where the printer controller 40 and the MFP 60 are set as the backup target devices. In this example, the amount of data of the backup target data held by the MFP 60 is 1200 MB; the data transfer rate from the MFP 60 to the external storage apparatus 5 connected to the MFP 60 is 30 MB; the amount of data of the backup target data held by the printer controller 40 is 600 MB; the data transfer rate from the printer controller 40 to the external storage apparatus 5 connected to the printer controller 40 is 150 MB; and the data transfer rate between the printer controller 40 and the MFP 60 (between devices) is 60 MB.

FIGS. 13A and 13B illustrate a required backup time in a case where the external storage apparatus 5 is connected to the MFP 60 and a required backup time in a case where the external storage apparatus 5 is connected to the printer controller 40, calculated on the basis of the information indicated in FIG. 12.

In a case where the external storage apparatus 5 is connected to the MFP 60 (see FIG. 13A), the amount of data transferred from the MFP 60 to the external storage apparatus 5 is 1.800 MB, and the transfer rate is 30 MB, so that the time required to transfer the data to the external storage apparatus 5 is 60 seconds. In addition, the amount of data transferred from the printer controller 40 to the MFP 60 is 600 MB, and the data transfer rate between the devices is 60 MB, so that the time required to transfer the data is 10 seconds. The required backup time is therefore 60 seconds+10 seconds, that is, 70 seconds.

On the other hand, in a case where the external storage apparatus 5 is connected to the printer controller 40 (see FIG. 13B), the amount of data transferred from the printer controller 40 to the external storage apparatus 5 is 1800 MB, and the transfer rate is 150 MB, so that the time required to transfer the data to the external storage apparatus 5 is 12 seconds. In addition, the amount of data transferred from the MFP 60 to the printer controller 40 is 1200 MB, and the data transfer rate between the devices is 60 MB, so that the time required to transfer the data is 20 seconds. The required backup time is therefore 12 seconds+20 seconds, that is, 32 seconds.

As a result, in step S406 of FIG. 11, the printer controller 40 that minimizes the required backup time is selected as the aggregation device.

Fourth Aspect

Figure 14:
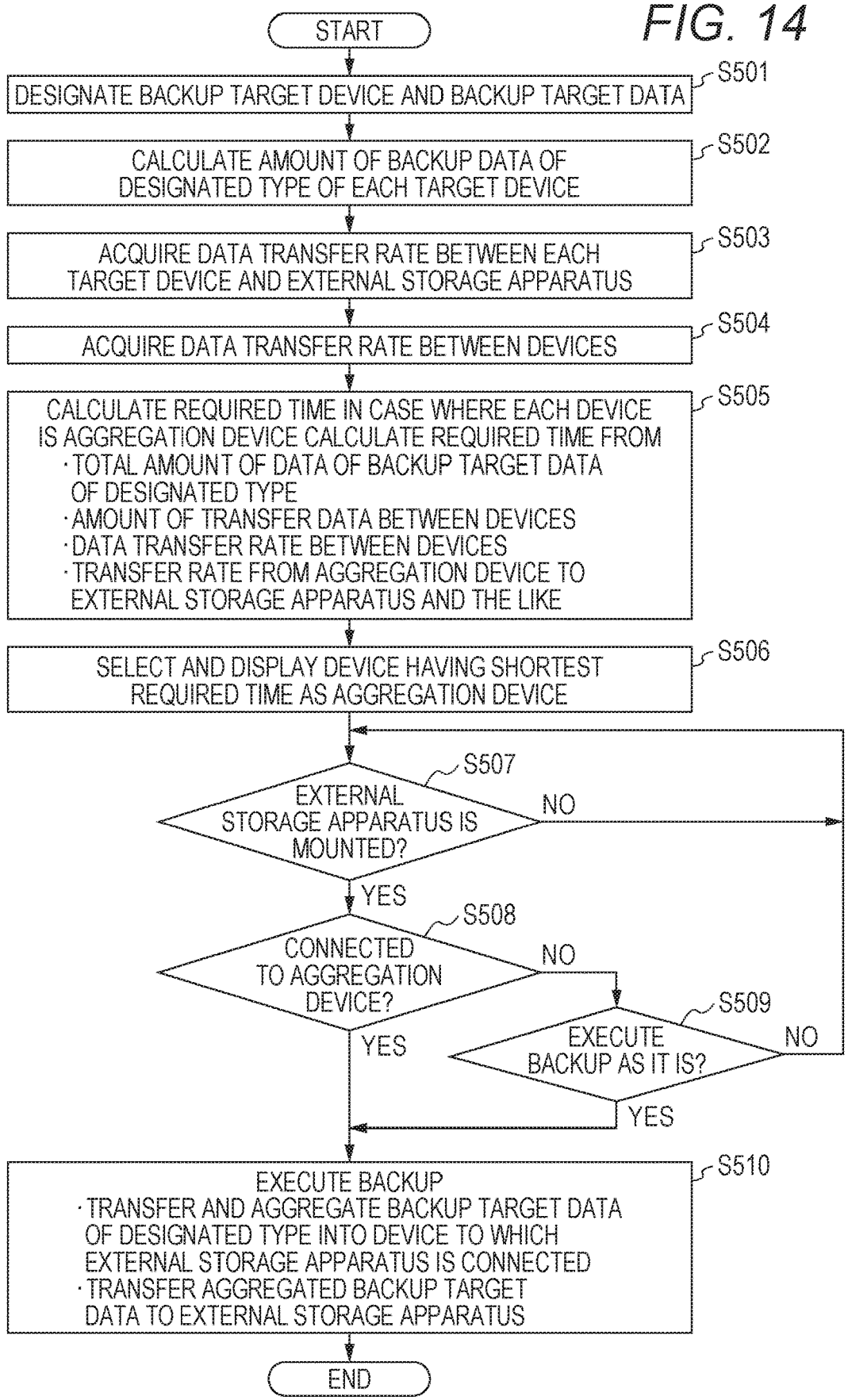
FIG. 14 is a flowchart illustrating a backup processing procedure in a fourth aspect of the image forming system.

Case Where Data Transfer Rates Between Devices and From Devices to External Storage Apparatus are Considered, and Backup Target Device and Backup Target Data are Designated FIG. 14 is a flowchart illustrating a backup processing procedure in a fourth aspect. The user performs input operation of an instruction regarding backup with the operation units 49 or 69 of a device of either the printer controller 40 or the MFP 60. The device designator 11 and the data designator 12 of a device having received the input operation (referred to as an operation device) accept designation of the backup target device and the backup target data (step S501).

The selector 13 of the device (operation device) having accepted the designation of the backup target device and target data from the user calculates an amount of data of the backup target data of the designated type held by the device for each designated backup target device (step S502). Next, a data transfer rate to the external storage apparatus 5 is acquired in each backup target device (step S503), and further, the data transfer rate between the backup target devices is acquired (step S504).

Next, the selector 13 of the operation device calculates a required time regarding backup execution in a case where each device is the aggregation device on the basis of information acquired in steps S502 to S504 (step S505). Then, a device having the shortest required time regarding the backup execution is selected as the aggregation device, and the selected aggregation device is displayed on the display of the operation device (step S506). Subsequent operations (steps S507 to S510) are the same as steps S307 to S310 illustrated in FIG. 8, and description thereof will be omitted.

Fifth Aspect

Figures 15, 16:
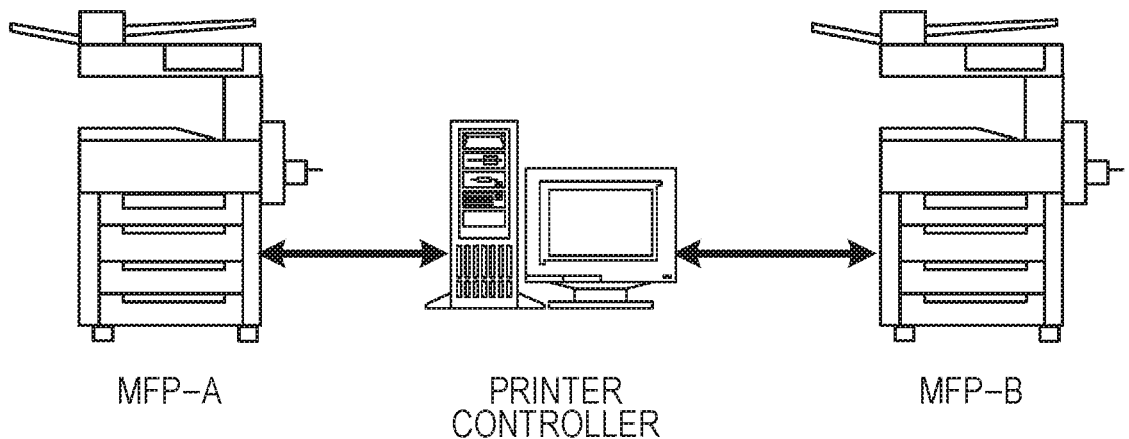
FIG. 15 is a diagram illustrating a system configuration in a case where an MFP-A and an MFP-B are connected to the printer controller.
FIG. 16 is a diagram indicating a list of the information acquired in steps S402 to S404 of FIG. 11 in the system configuration of FIG. 15.

Case Where Data Transfer Rates Between Three or More Devices and Data Transfer Rate From Each Device to External Storage Apparatus are Considered, and Backup Target Device is Designated FIG. 15 illustrates a system configuration in a case where an MFP-A 60a and an MFP-B 60b are connected to the printer controller 40. A flow of processing regarding backup in the system is the same as that in FIG. 11.

FIG. 16 indicates a list of the information acquired in steps S102 to S404 of FIG. 11 in the system configuration illustrated in FIG. 15. The amount of data of the backup target data held by the MFP-A 60a is 1200 MB; the data transfer rate from the MFP-A 60a to the external storage apparatus 5 connected to the MFP-A 60a is 30 MB; and the amount of data of the backup target data held by the MFP-B 60b is 2400 MB; the data transfer rate from the MFP-B 60b to the external storage apparatus 5 connected to the MFP-B

60b is 150 MB; the amount of data of the backup target data held, by the printer controller 40 is 600 MB; the data transfer rate from the printer controller 40 to the external storage apparatus 5 connected, to the printer controller 40 is 100 MB; the data transfer rate between the MFP-A 60a and the printer controller 40 is 100 MB; and the data transfer rate between the MFP-B 60b and the printer controller 40 is 100 MB.

FIGS. 17A to 17C indicate a required backup time in a case where the external storage apparatus 5 is connected to the MFP-A 60a (FIG. 17A), a required backup time in a case where the external storage apparatus 5 is connected to the printer controller 40 (FIG. 17B), and a required backup time in a case where the external storage apparatus 5 is connected to the MFP-B 60b (FIG. 17C), calculated on the basis of the information illustrated in FIG. 16.

In a case where the external storage apparatus 5 is connected to the MFP-A 60a, the amount of data transferred from the MFP-A 60a to the external storage apparatus 5 is 4200 MB, and the transfer rate is 30 MB, so that the time required to transfer the data to the external storage apparatus 5 is 140 seconds. In addition, the amount of data transferred from the printer controller 40 to the MFP-A 60a is 600 MB, and the data transfer rate between these devices is 100 MB, so that the time required to transfer the data is 6 seconds. The amount of data transferred from the MFP-B 60b to the printer controller 40 is 2400 MB, and the data transfer rate between these devices is 60 MB, so that the time required to transfer the data is 40 seconds, and the time required to further transfer the data from the printer controller 40 to the MFP-A 60a is 24 seconds since the amount of data is 2400 MB and the data transfer rate between the devices is 100 MB. The required backup time is therefore 140 seconds+6 seconds+40 seconds+24 seconds, that is, 210 seconds.

In a case where the external storage apparatus 5 is connected to the printer controller 40, the amount of data transferred from the printer controller 40 to the external storage apparatus 5 is 4200 MB, and the transfer rate is 100 MB, so that the time required to transfer the data to the external storage apparatus 5 is 42 seconds. In addition, the amount of data transferred from the MFP-A 60a to the printer controller 40 is 1200 MB, and the data transfer rate between these devices is 100 MB, so that the time required to transfer the data is 12 seconds. The amount of data transferred from the MFP-B 60b to the printer controller 40 is 2400 MB, and the data, transfer rate between these devices is 60 MB, so that the time required to transfer the data is 40 seconds. The required backup time is therefore 42 seconds+12 seconds+40 seconds, that is, 94 seconds.

In a case where the external storage apparatus 5 is connected to the MFP-B 60b, the amount of data transferred from the MFP-B 60b to the external storage apparatus 5 is 4200 MB, and the transfer rate is 150 MB, so that the time required to transfer the data to the external storage apparatus 5 is 28 seconds. In addition, the amount of data transferred from the printer controller 40 to the MFP-B 60b is 600 MB, and the data transfer rate between these devices is 60 MB, so that the time required to transfer the data is 10 seconds. The amount of data transferred from the MFP-A 60a to the printer controller 40 is 2400 MB, and the data transfer rate between these devices is 100 MB, so that the time required to transfer the data, is 24 seconds, and the time required to further transfer the data from the printer controller 40 to the MFP-B 60b is 40 seconds since the amount of data is 2400 MB and the data transfer rate between the devices is 60 MB. The required backup time is therefore 28 seconds+10 seconds+24 seconds+40 seconds, that is, 102 seconds.

As a result, in step S406 of FIG. 11, the printer controller 40 that minimizes the required backup time is selected as the aggregation device.

As described above, in a case where the transfer rates between the devices are considered and the required backup time is calculated for three or more devices, the connection status between the devices and the data transfer route are considered, and the required backup time is calculated in a case where the external storage apparatus 5 is connected to each device, and a device that minimizes the required time is selected as the aggregation device. The same applies to a case where the backup target data is designated.

In the above, the embodiment of the present invention has been described with reference to the drawings; however, the specific configuration is not limited to that illustrated in the embodiment, and even a configuration including changes and additions within the scope not deviating from the gist of the present invention is also included the present invention.

The type of the device is not limited to the printer controller 40 and the MFP 60 exemplified in the embodiment, and any device may be used as long as the device includes a storage apparatus that holds information.

In addition, the backup apparatus 10 may be provided in the device or may be provided separately from the device. In addition, in a case where the functions of the backup apparatus 10 are provided in the device, it is not always necessary to provide all the functions of the backup apparatus 10 in all devices, and may be provided in only one device.

Although embodiments of the present invention have been described and illustrated in detail, the disclosed embodiments are made for purposes of illustration and example only and not limitation. The scope of the present invention should be interpreted by terms of the appended claims.

What is claimed is:

1. A backup apparatus comprising:
a hardware processor that:
selects one of a plurality of devices, the devices being communicably connected to each other and each including a storage apparatus and a connection I/F to connect to an external storage apparatus, as a device to be connected to the external storage apparatus via the connection I/F thereof, and
in a state in which the external storage apparatus is connected to the connection I/F of the selected device, collectively makes a backup of backup target data held by the plurality of devices into the external storage apparatus connected to the connection I/F of the selected device,
wherein the hardware processor selects, from among the plurality of devices, said one of the plurality of devices as the device to be connected to the external storage apparatus via the connection I/F thereof based on a predetermined selection condition including an amount of data of backup target data held by each of the devices.

2. The backup apparatus according to claim 1, wherein the hardware processor selects, as the device to be connected to the external storage apparatus via the connection I/F thereof, a device from among the plurality of devices having a maximum amount of data of backup target data held.

3. The backup apparatus according to claim 1, wherein the hardware processor selects, as the device to be connected to the external storage apparatus via the connection I/F thereof, a device from among the plurality of devices that minimizes a total of a data transfer time to aggregate the backup target data held by the plurality of devices into one device and a time to transfer and store the backup target data aggregated into the one device from the one device to the external storage apparatus connected to the connection I/F of the one device.

4. The backup apparatus according to claim 1, wherein the hardware processor further receives designation of the plurality of devices as backup target devices.

5. The backup apparatus according to claim 1, wherein the hardware processor further receives designation of the backup target data.

6. The backup apparatus according to claim 1, further comprising a display that displays the device selected by the hardware processor as the device to be connected to the external storage apparatus via the connection I/F thereof.

* * * * *